United States Patent [19]
Cox

[11] Patent Number: 5,480,465
[45] Date of Patent: Jan. 2, 1996

[54] AIR/FOREIGN MATERIAL SEPARATOR

[75] Inventor: Donald G. Cox, Bargersville, Ind.

[73] Assignee: Air Equipment & Engineering, Inc., Martinsville, Ind.

[21] Appl. No.: 234,165

[22] Filed: Apr. 28, 1994

[51] Int. Cl.⁶ .................................................. B01D 45/00
[52] U.S. Cl. .............................. 55/472; 55/477; 55/486; 55/512; 55/527
[58] Field of Search ........................... 55/282, 318, 329, 55/431, 472, 477, 486, 512, 527; 95/277, 279; 96/191

[56] References Cited

U.S. PATENT DOCUMENTS

| | | | |
|---|---|---|---|
| 2,838,131 | 6/1958 | Peterson | 55/329 |
| 2,935,158 | 5/1960 | Braun | 55/329 |
| 3,491,518 | 1/1970 | Williams | 55/431 |
| 3,646,595 | 2/1972 | Williams | 55/431 |
| 4,584,003 | 4/1986 | Oda et al. | 55/431 |
| 4,764,191 | 8/1988 | Morelli | 55/431 |
| 4,783,259 | 11/1988 | Wade | 55/477 |
| 4,915,714 | 4/1990 | Teague et al. | 55/486 |

FOREIGN PATENT DOCUMENTS 63-100913  5/1988  Japan ..................................... 55/282

*Primary Examiner*—C. Scott Bushey
*Attorney, Agent, or Firm*—Woodard, Emhardt, Naughton Moriarty & McNett

[57] ABSTRACT

A device for separating foreign material from air. A main frame includes a chamber having one or more inlet tubes, an air outlet, and a foreign material outlet. An air pump forces the air including the foreign material into the chamber via the inlet tubes. Guides extend between the inlet tubes and the foreign material outlet. The air outlet is positioned between the inlet tubes and the foreign material outlet and causes the air within the guides to change direction exiting the chamber while the foreign material continues to the foreign material outlet. A collector receives the foreign material.

5 Claims, 4 Drawing Sheets

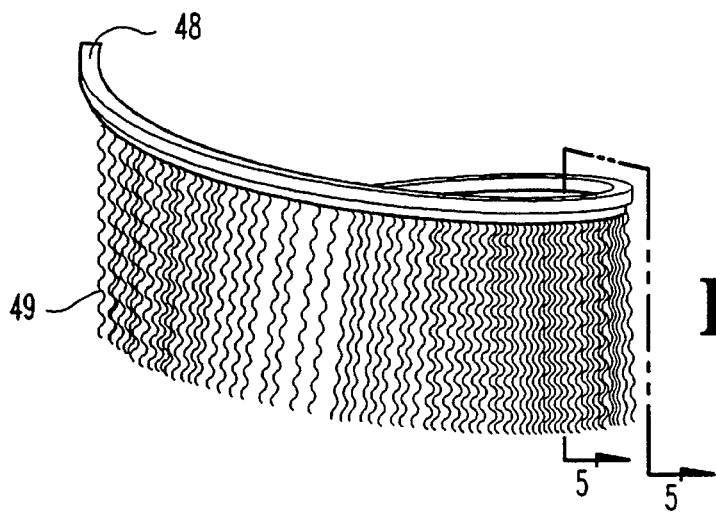
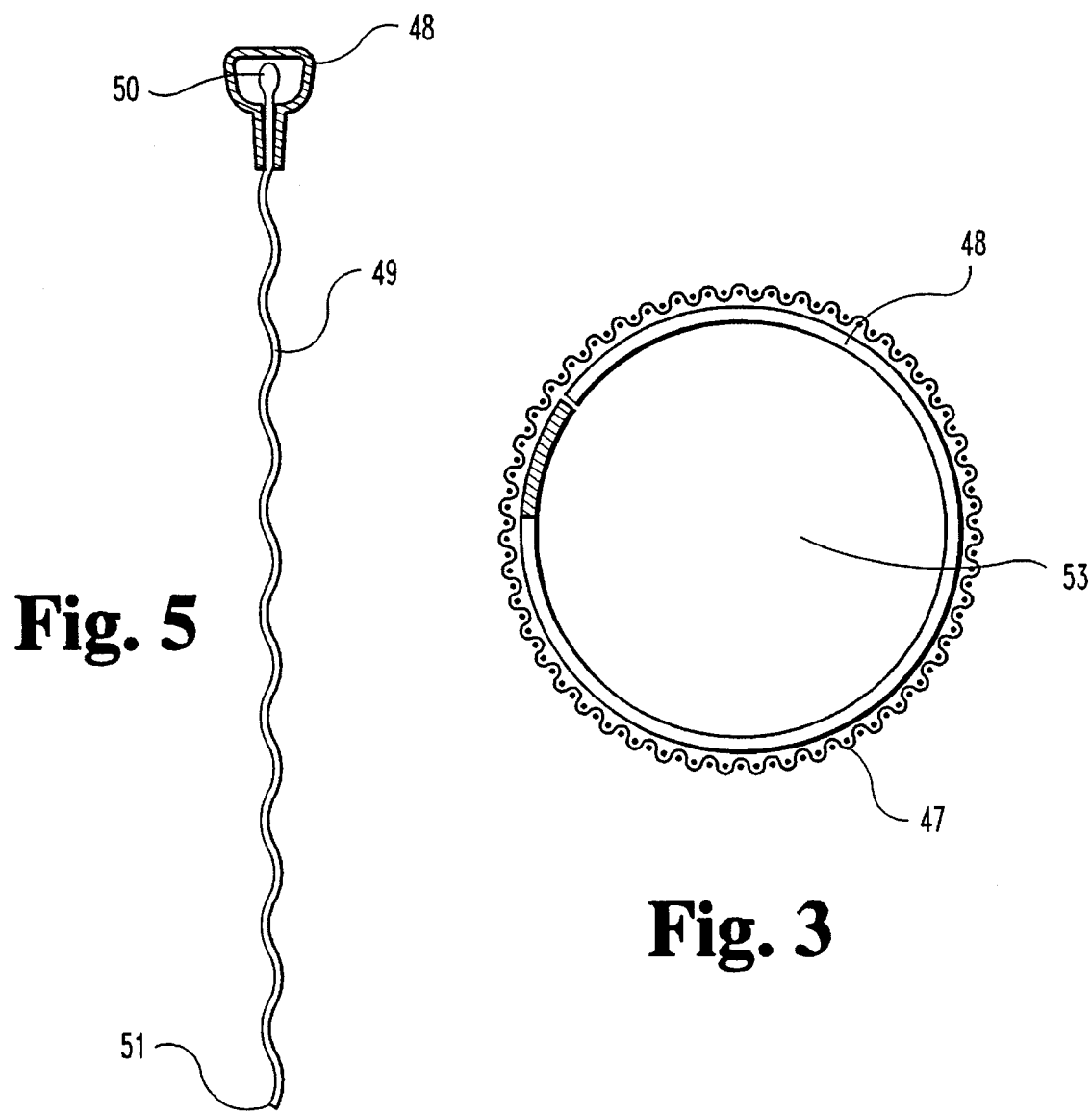

AIR/FOREIGN MATERIAL SEPARATOR

BACKGROUND OF THE INVENTION

1. Field of the Invention

This invention is in the field of filters and separators for separating foreign material from air.

2. Description of the Prior Art

One of the major problems in the industrial air handling business is the separation of air from particulate, mist, or other foreign material. In many manufacturing processes, scrap material is created and is conveyed with air to a central storage area by means of a cyclone or centrifugal separator. The prior separators typically utilize the force of gravity to separate the foreign material from the air, thereby requiring a separator chute of substantial length. The separators currently available are relatively large in size and in many cases extend through the ceiling and roof of the building. In contrast, the separator disclosed herein utilizes the kinetic energy of the foreign material to separate same from the air thereby allowing the separator to have a compact configuration. The relatively large area occupied by the current separators as well as the cost in modifying the building to receive the separator are major drawbacks associated with the current air separators and filters. Disclosed herein is a compact air separator which achieves the desired separation of foreign material from the air without requiring modification of the building.

SUMMARY OF THE INVENTION

One embodiment of the present invention is an apparatus for separating foreign material frown air comprising a frame including interior surfaces forming an interior passage with an air and foreign material inlet and a foreign material outlet. A pressure source is in fluid communication with the passage and is operable to force air with foreign material into the inlet and to impart forward velocity to the foreign material forcing the air and the foreign material to move in the passage along a path in a first direction. A diverter is at a location in the passage between the inlet and the foreign material outlet and is operable to allow the air to be diverted in a second direction away from the first direction and the path while the forward velocity of the foreign material causes the foreign material to continue to move along the path and out the foreign material outlet.

A further embodiment of the present invention is a method of separating foreign material from air comprising the steps of forcing air and foreign material with pressure source means into a guide while imparting forward velocity to the foreign material. The method further includes the step of guiding the air and foreign material with the guide along a path extending in a first direction and changing the direction of air within the guide with the pressure source means from the first direction to a second direction while allowing the forward velocity of the foreign material to cause the foreign material to continue in the first direction.

It is an object of the present invention to provide new and improved separator for separating foreign material from air.

A further object of the present invention is to provide a compact air/foreign material separator.

In addition, it is an object of the present invention to provide a new and improved method for separating foreign material from air.

Related objects and advantages of the present invention will be apparent in the following description.

BRIEF DESCRIPTION OF THE DRAWINGS

FIG. 3 is an enlarged cross sectional view taken along a line and viewed in the direction of arrows 3—3 of FIG. 2.

FIG. 4 is a fragmentary enlarged perspective view of the filter brush.

FIG. 5 is an enlarged cross sectional view taken a line and viewed in the direction of arrows 5—5 of FIG. 4.

DESCRIPTION OF THE PREFERRED EMBODIMENTS

Figure 1:
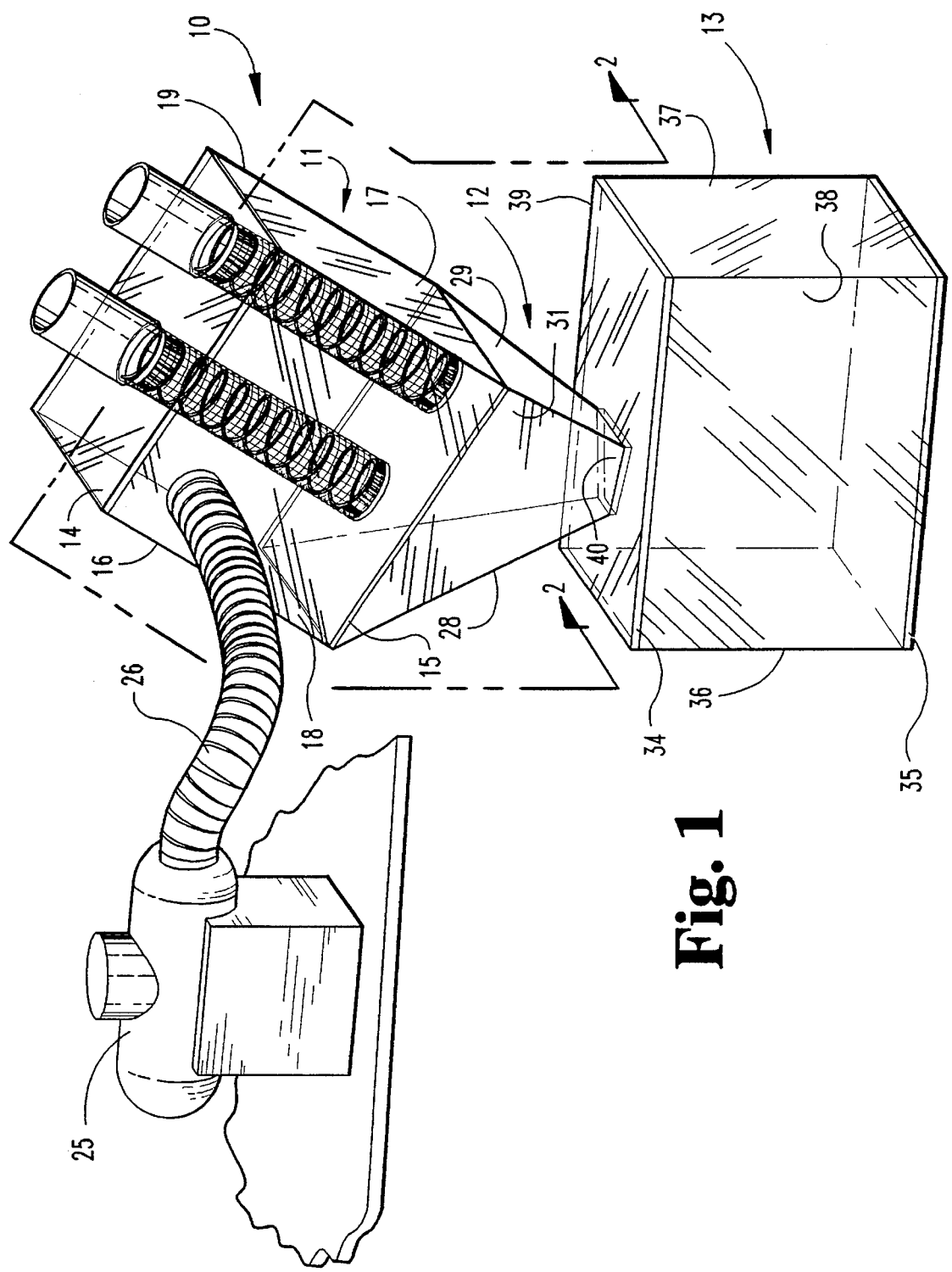
FIG. 1 is a perspective view of the preferred embodiment of the air filter incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an apparatus or separator 10 for separating foreign material from air. Separator 10 includes a frame composed of a upper section 11 forming an interior chamber, a middle section 12 forming a funnel position between and connected to the upper section 11 and the lower section 13 forming a foreign material storage chamber. Upper section 11 has a six sided box configuration with a top wall 14 joined to a bottom wall 15 by means of a pair of side walls 16 and 17 along with a front wall 18 and back wall 19. The six walls have interior surfaces which form an interior chamber or passage 20 (FIG. 2) in which the foreign material is separated from the air.

Top wall 14 includes a plurality of inlet tubes allowing communication between the outside air and the interior chamber or passage 20. In the embodiment shown in FIG. 2, a pair of tubes 21 and 22 are mounted to the top wall 14, although it is to be understood that the present invention includes a separator having a single tube or a plurality of tubes greater than the tubes depicted in the drawing. Top wall 14 has a pair of holes 23 and 24 which are aligned with the hollow interior of the cylindrical tubes 21 and 22 fixedly mounted to wall 14.

A conventional pressure source means or air pump 25 (FIG. 1) is connected by means of a conventional conduit 26 having its opposite end fixedly attached to front wall 18. Hole 27 in wall 18 is aligned with the hollow interior of conduit 26 thereby allowing air pump 25 to withdraw air from the hollow interior of the upper section 11 via hole 27.

Middle section 12 includes a pair of side walls 28 and 29 joined to a back wall 30 and front wall 31 forming an interior funnel shaped passage 33 extending between the upper section 11 and lower section 13. The top ends of walls 28–31 are mounted to wall 15 and to the top wall 34 of the lower section.

Lower section 13 has a six sided box configuration with the top wall 34 being joined to its bottom wall 35 by means of a pair of side walls 36 and 37 along with a front wall 38 and back wall 39. The six walls of lower section 13 form an interior storage chamber for receiving foreign material which passes from the upper section 11 via the middle section. Top wall 34 has an opening 40 sized identically to the interior bottom opening of middle section 12. Wall 15 includes a pair of apertures 41 and 42 through which foreign material is ejected into the middle section. A door or other means is provided in the lower section 13 to enable the user to periodically empty the foreign material from the storage chamber formed within lower section 13.

Suitable guides extend between holes 23 and 24 in wall 14 and holes 41 and 42 in wall 15. The guides are operable to direct the foreign material towards the middle section 13 while allowing air to escape the upper section 11 via conduit 26. Thus, once pump 25 is energized, the pump is operable to force external air with foreign material into tubes 21 and 22 which form inlets into passage 20. The air pump thus, imparts forward velocity to the foreign material moving through tubes 21 and 22 forcing the air and foreign material to move in passage 20 along a path defined by the guides extending between holes 23, 24 and 41, 42 in a first direction shown by arrows 43 (FIG. 2).

Figure 2:
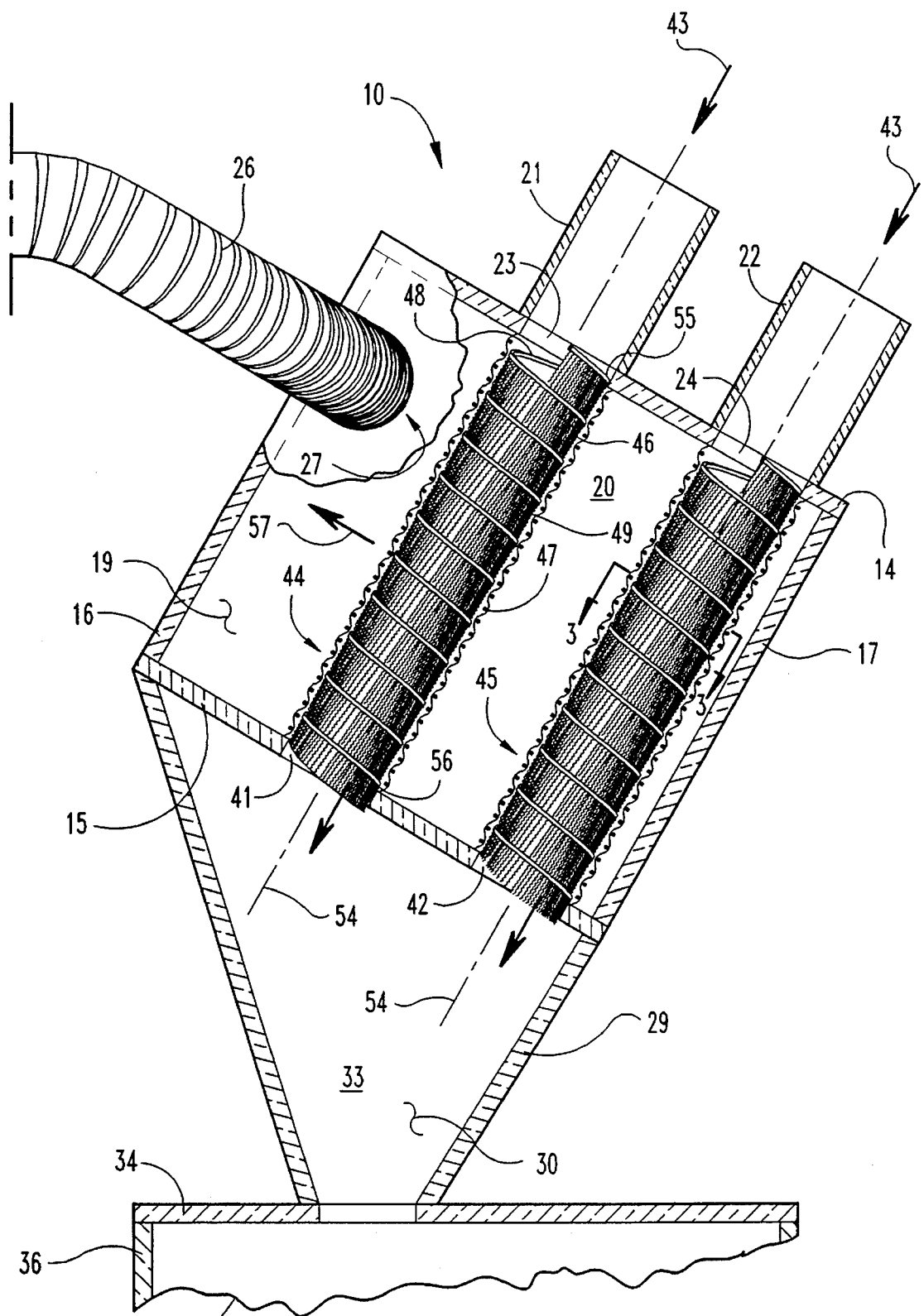
FIG. 2 is a cross sectional view taken along a line and viewed in the direction of arrows 2—2 of FIG. 1.

In the preferred embodiment shown in FIG. 2, the guides extending between holes 23, 24 and 41, 42 include spiral shaped brushes mounted within mesh screen frames. Guide 44 extends between holes 23 and 41 whereas guide 45 extends between holes 24 and 42. Guide 44 will now be described it being understood that an identical description applies to guide 45. Guide 44 includes a spiral shaped brush 46 mounted within a mesh screen frame 47. Screen 47 is fragmented in FIG. 2 to illustrate the interior spiral brush 46. The brush includes a rigid frame 48 which extends in spiral fashion from wall 14 to wall 15. Cantileverdly mounted to and depending from frame 48 are a plurality of flexible bristles 49.

Frame 48 and bristles 49 may take a variety of configurations. In the embodiment illustrated in FIGS. 3–5, frame 48 has an inverted U-shaped configuration with the upper proximal ends 50 of the bristles being positioned within and secured to frame 48 with the distal ends 51 of the bristles being positioned therebeneath. Best results have been obtained by utilizing a bristle 49 having a crimped configuration along its length between proximal end 50 and distal end 51. Frame 48 tightly squeezes against the proximal ends 50 of the bristles preventing the bristles from escaping frame 48.

A filter frame extends around the spiral shaped brush and is utilized to secure the brush within chamber 20. In the embodiment shown in FIGS. 2–5, the filter frame includes a mesh screen 47 (FIG. 3) having a cylindrical configuration in which is located the spiral shaped frame 48 and bristles 49. The brush thereby forms a cylindrical passage or tunnel 53 which extends along a straight line or axis 54 (FIG. 2) with the axis extending centrally through holes 23 and 41 as well as tube 21. Mesh screen 47 is fixedly secured to walls 14 and 15 by conventional fastening devices. Likewise, frame 48 is secured along its length to screen 47 via fastening devices. For example, small wires may be utilized to extend around frame 48 and one of the adjacent portions of screen 47. Likewise, the top end 55 and bottom end 56 of frame 48 may be fixedly secured respectively to walls 14 and 15. In an identical manner, guide 45 includes a spiral brush within a cylindrical screen forming a straight tunnel with axis 54.

Air outlet 27 provides a diverting means at a location in passage 20 between the inlets 23, 24 and foreign material outlets 41 and 42 with aperture 27 allowing pump 25 to pull the air flowing in the direction of arrows 43 (FIG. 2) through guides 44 and 45 and tunnel 53 and to allow the air to be diverted in a second direction shown by arrow 57 arranged perpendicular to axis 54. Bristles 49 are flexible, thereby allowing the air to flow around the bristles and escape tunnel 53 and flow into conduit 26. The kinetic energy of the foreign material flowing through the tunnels in the direction of arrows 43 is sufficient to carry the foreign material through the entire length of each tunnel exiting via holes 41 and 42 into the funnel shaped passage 33. The forward velocity of the foreign material is sufficient to cause the foreign material to continue to move through the tunnels even though the air escapes the tunnels in the direction of arrow 57. Best results are obtained when the inlet velocity present within tubes 21 and 22 is between 500 feet per minute to 6000 feet per minute. The brushes provide blocking means to limit sideways movement of the foreign material in the direction of arrow 57 and thus ensure the foreign material continues to move in the direction of arrows 43 eventually exiting passage 20. The blocking means in the embodiment shown in FIG. 2 includes not only the brush with bristles but also the mesh screen 47 which cooperatively form two straight tunnels within passage 20 through which the foreign material moves. In order to prevent the foreign material, such as the paper strips, from sticking onto the bristles, the length of guides 44 and 45 should each be not less than 1.2 times the diameter of the guide to 2.7 times the guide diameter.

The present invention contemplates utilizing a screen 47, without utilizing a brush 46; however, the construction of the guides will depend on the types of foreign material being separated from the air. For example, a fine mesh screen in a cylindrical configuration forming screen 47 without the use of a brush 46 will in many cases become clogged if the foreign material is dust. On the other hand, if the mesh screen includes relatively large openings such as found in chicken wire then to use such a screen without a brush 46 may result in foreign material, such as strips of paper, sticking to the screen in various locations. When utilizing both a screen 47 and a brush 46, the screen maintains the brush in position; however, the distal ends of the bristles are allowed to move thereby enabling the bristles to flex providing a self-cleaning feature for the brush preventing sticking of the foreign material on the brush.

Figure 6:
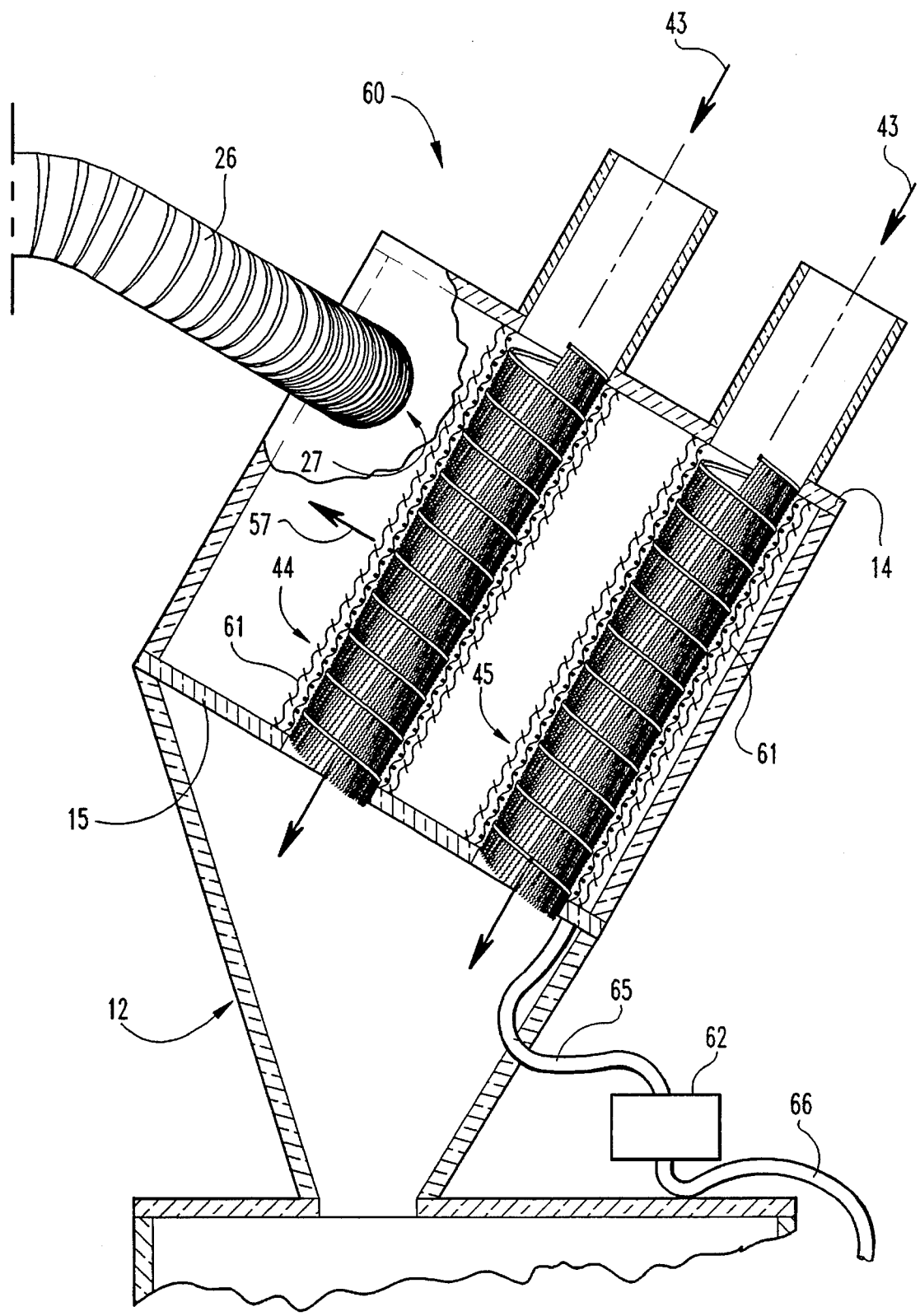
FIG. 6 is the same view as FIG. 2 only showing an alternate embodiment of the present invention.

In the event liquid droplets or mist, such as water or oil, is to be removed from the air then an additional filter is provided which surrounds the brush and screen guide. Separator 60 (FIG. 6) is identical to separator 10 with the exception that an additional cylindrical filters 61 are mounted between walls 14 and 15 surrounding guides 44 and 45 and thus also surrounding the spiral shaped brush and cylindrically shaped screen for each guide and with the further exception that a liquid trap 62 is provided to gather liquid run-off from filters 61. Thus, the external air containing moisture is pulled in the direction of arrows 43 into the inlet tubes by operation of pump 25. The air continues to flow along a path extending through guides 44 and 45 until eventually the air exits guides 44 and 45 and filters 61 in the direction of arrow 57 and into conduit 26. The droplets of liquid having sufficient mass and velocity will. continue to flow in the direction of arrows 43 exiting into the funnel shaped middle section 12 and eventually being collected in the foreign material storage lower section 13. The finer liquid mist having insufficient velocity and mass to carry it forward will exit with the air in the direction of arrow 57 and be collected by filter 61 eventually draining downward atop bottom wall 15 and exiting chamber 20 via an outlet connected to tube 65, in turn, leading to the conventional liquid trap 62. An outlet tube 66 extends from the bottom of trap 62 into the lower section 13 for final collection of the liquid. Trap 62 may be of conventional design and be merely operable to allow liquid flow only in the direction from tube 65 to tube 66. In the embodiment shown in FIG. 6, a pair of cylindrical filters 61 are provided with each filter 61 surrounding a cylindrical mesh screen, in turn, surrounding the spiral shaped brush. Best results will be obtained by producing filter 61 from pleated felt.

Both the preferred embodiment separator (FIG. 1) and the alternate embodiment separator (FIG. 6) function on the basis of utilizing the kinetic energy of the particles within the air entering the separator. The incoming air at a relatively high velocity causes the particulate to have sufficient kinetic energy so that the particulate will continue to move along a straight line through the guides while the much lighter air abruptly turns in a second direction exiting the guides. The heavier particulate with greater mass and velocity continues on through the separator and is thereby eventually collected. This principal not only creates a very efficient separator but also a very compact separator without the necessity for the relatively long frames utilized by cyclone or centrifugal separators. In addition, a great number of inlet tubes may be provided in the upper section 11 of the separator allowing for collection and eventual separation of particulate laden air from many separate sources without decreasing the separation efficiency.

The separator disclosed herein has many different applications. For example, the separator may be used to replace a cyclone filter to remove paper, cardboard, wood chips, saw dust, etc. The separator disclosed herein is not only much shorter and smaller than a cyclone separator but is less costly to operate. The separator may also act as a pre-filter and thus lessen the final filter loading. Such a pre-filter will remove sand or other particulate and thus prevent paper or cloth filter erosion. As previously described, the present filter may be utilized to remove oil or water mist as a primary separator. Such separation will agglomerate droplets and discharge the droplets through the guide to the storage section. Dirt will also be less likely to plug the slick brush surface than the prior flat filters. Further, the present filter may be used as a pre-cleaner for stringy material such as fiberglass. The fiberglass will not stick to the guide brush, whereas in the prior art filters, fiberglass will bind and not release from the cartridge or bag filters. In addition, the present filter may act as a spark trap. Many manufacturing processes create sparks or burning materials and will thereby ignite bag houses and cartridge collectors. By utilizing the spiral brush disclosed herein and by producing the bristles from metal, a much smaller and more positive spark trap will be provided.

Several collector and mounting configurations are possible with the present invention. For example, with a mist applicator, the inlet tubes and guides are arranged vertically, whereas for a paper separator, the inlet tubes and guides extend horizontal or slope downward because of height restrictions and incoming ducts extending horizontally. Certain applications may require final filters as small particulate or mist may pass through the spiral shaped brush.

The method of separating foreign material or debris from air includes the steps of forcing air and foreign material with pressure source means such as a pump into a guide while imparting forward velocity to the foreign material. The air and foreign material are then guided along a path extending in a first direction. The direction of the air within the guide is then changed from the first direction to a second direction while allowing the forward velocity of the foreign material to cause the foreign material to continue to move in the first direction. The guide includes a flexible outlet which limits movement of the foreign material in the second direction. Last, the foreign material is collected once it leaves the guide.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for separating foreign material from air comprising:

frame means including interior surfaces forming an interior passage with an air and foreign material inlet and a foreign material outlet, said frame means including a storage bin connected to said foreign material outlet;

pressure source means having a pressure source outlet between said air and foreign material inlet and said foreign material outlet and in fluid communication with said passage being operable to force air with foreign material into said air and foreign material inlet and to impart forward velocity to said foreign material forcing said air and said foreign material to move in said passage along a straight path in a first direction; and, bristle means located in said passage between said air and foreign material inlet and said foreign material outlet and being operable to allow all of said air to he diverted in a second direction toward said pressure source outlet away from said first direction and said straight path while said forward velocity of said foreign material causes said foreign material to continue to move along said straight path and out said foreign material outlet to come to rest in said storage bin, said bristle means forming said passage and including a screen and a plurality of flexible bristles mounted thereto forming a straight tunnel through which said foreign material moves toward said foreign material outlet, said flexible bristles movable to allow air to move from said tunnel to said pressure source outlet while said forward velocity causes said foreign material to continue to move in said first direction.

2. The apparatus of claim 1 wherein:

said bristles have proximal ends and freely movable distil ends with said proximal ends positioned closer to said air and foreign material inlet than said distil ends, said bristles flex as said air flows therethrough in said second direction limiting said foreign material from sticking thereon; and, further comprising:

mounting means connected to said proximal ends mounting said bristles within said passage.

3. The apparatus of claim 1 wherein:

said frame means includes a second air and foreign material inlet and a second foreign material outlet;

said pressure source means is operable to force additional air with additional foreign material into said second inlet and to impart forward velocity to said additional foreign material forcing said additional air and said additional foreign material to move in said passage along a second straight path in a third direction; and further comprising:

second bristle means in said passage between said second inlet and said second foreign material outlet operable to allow said additional air to be diverted in a fourth direction away from said third direction and said second path while forward velocity of said additional foreign material causes said additional foreign material to continue to move along said second path and out said second foreign material outlet.

4. An apparatus for separating foreign material from air comprising:

a main frame including interior surfaces forming an interior passage with an air and foreign material inlet and a foreign material outlet;

an air pump connected to said passage to force air with foreign material into said inlet and to impart forward velocity to said foreign material with said air and said foreign material moving in said passage along a path in a first straight direction;

a plurality of bristles positioned within said passage forming a straight tunnel within said passage through which said foreign material moves toward said foreign material outlet;

said bristles having proximal ends and freely movable distil ends with said proximal ends positioned closer to said inlet than said distil ends.

a bristle frame having a spiral configuration and mounted to said main frame and connected to said proximal ends mounting said bristles within said passage; and wherein:

said frame includes an air outlet at a location in said passage between said inlet and said foreign material outlet to allow said air pump to divert said air in a second direction away from said first direction and said path while said forward velocity of said foreign material causes said foreign material to move along said path and out said foreign material outlet.

5. A separator for separating foreign material from air comprising: housing means forming a chamber with an inlet, an air outlet and a foreign material outlet;

air pressure means connected to said housing means and operable to force air and foreign material into said chamber via said inlet; and, flexible guide means forming a tunnel, said flexible guide means mounted within said chamber and extending along a path in a first direction from said inlet to said foreign material outlet and operable to flex to allow air to move from said tunnel and escape said chamber via said air outlet while guiding said foreign material to said foreign material outlet; and wherein:

said air pressure means is operable to impart forward velocity to said foreign material causing said foreign material to continue to move in said tunnel in said first direction toward said foreign material outlet although air within said tunnel exits said tunnel in a second direction between said inlet and said foreign material outlet:

said flexible guide means includes a plurality of bristles arranged in a cylindrical configuration extending between said inlet and said foreign material outlet with said bristles having proximal ends and freely movable distil ends with said proximal ends positioned closer to said inlet than said distil ends, each of said bristles have crimped configurations between said proximal ends and said distil ends.

* * * * *